United States Patent [19]

Lapierre

[11] Patent Number: 5,447,348
[45] Date of Patent: Sep. 5, 1995

[54] EXTRUDED CONFECTIONARY STICK AND METHOD OF MAKING SAME

[76] Inventor: Robert Lapierre, 2800 Des Pintades Ste., Laval, Canada, H7L 4S9

[21] Appl. No.: 189,638

[22] Filed: Feb. 1, 1994

[51] Int. Cl.⁶ .................................................. A23G 9/26
[52] U.S. Cl. ........................................ 294/1.1; 294/5.5; 426/134
[58] Field of Search ............... 294/1.1, 5.5, 23.5, 294/87.1, 87.11, 902; 426/91, 100, 101, 104, 134; D1/103, 104; 264/177.1, 177.16

[56] References Cited

U.S. PATENT DOCUMENTS

| D. 222,323 | 10/1971 | Defee | 426/134 X |
| 1,593,858 | 7/1926 | Venable | 426/134 X |
| 1,929,906 | 10/1933 | Skokowski | 426/134 X |
| 3,290,157 | 12/1966 | Schwartz et al. | 426/134 |
| 3,498,808 | 3/1970 | Wagner | 294/5.5 |
| 3,663,717 | 5/1972 | Coster | 426/134 X |
| 4,256,685 | 3/1981 | Vassar | 264/177.1 X |
| 5,056,841 | 10/1991 | Yong | 294/1.1 |

FOREIGN PATENT DOCUMENTS 610746  5/1979  Sweden .................. 426/134

*Primary Examiner*—Dean Kramer
*Attorney, Agent, or Firm*—Vorys, Sater, Seymour & Pease

[57] ABSTRACT

An extruded confectionary stick and method of making the same is provided. The confectionary stick is formed using an extrusion process to include a plurality of embedded grooves, which reduce material and weight in the stick while preserving structural rigidity. An undercut portion may be provided in the grooves to prevent sticks placed on top of each other from interlocking. Use of an extrusion process results in a simpler, more cost-effective manufacture and allows flexibility in profile design.

7 Claims, 2 Drawing Sheets

EXTRUDED CONFECTIONARY STICK AND METHOD OF MAKING SAME

FIELD OF THE INVENTION

The invention relates to a lightweight, extruded stick for supporting confectionary items, and a method of making the same.

BACKGROUND OF THE INVENTION

The use of supporting sticks in the packaging of confectionary articles is well known. For example, confectionary material such as ice cream servings and lollipops have traditionally been packaged on a supporting stick made of cardboard, paper, or wooden material. The sticks themselves are formed in any of several appropriate shapes, such as a long cylinder or a long rectangular shape.

Attempts have been made previously to substitute a plastic material for the more traditional cardboard or similar materials in confectionary sticks. For instance, U.S. Pat. No. 3,498,808 to Wagner discloses the use of a molded, flexible plastic confection stick including longitudinal grooves molded into a section of the stick.

While such a general design provides an adequate support structure, the longitudinal grooves required in the design may cause a handling problem. That is to say, when a number of such sticks are packaged in the same container, the ridges and grooves of adjacent sticks tend to interlock horizontally, causing them to stick together. The interlocked sticks must then be separated in some manner before fixing the confectionary material to them.

Moreover, the manufacture of such a confectionary stick according to the molding process required to produce a Wagner stick is relatively expensive to tool and maintain.

There is therefore a continuing desire to devise a lightweight, strong confectionary stick which can be economically and easily manufactured.

SUMMARY OF THE INVENTION

It is accordingly an object of the invention to provide a lightweight, strong confectionary stick through the use of an economical extrusion process.

It is another object of the invention to provide an extrusion process for producing a plastic confectionary stick having a configuration which achieves the required strength with a minimum amount of plastic material.

A further object of the invention is to continuously extrude a plastic strip having longitudinal grooves which is cut to provide individual confectionary sticks having the required design and strength to hold and retain the confection thereon.

A still further object of the invention is to continuously extrude a plastic strip having longitudinal grooves which by their design eliminate stick interlock, make bulk handling, shipping and storage more convenient, and facilitate use in automatic dispensing machines.

These and other objects of the invention are achieved through an extrusion process which comprises heating an extrudible plastic material in an extrusion apparatus, extruding a continuous strip of the plastic material through a die adapted to provide longitudinal grooves on at least one face portion of the strip, cutting the strip into individual unit sticks, and recovering the sticks for subsequent confectionary use. The confectionary sticks so produced are strong enough for the intended purpose but since they contain only a minimum amount of plastic material they can be more economically produced than is possible with previously known methods and designs.

BRIEF DESCRIPTION OF THE DRAWINGS

The invention will be described with reference to the drawings, in which like parts are labelled with like numbers. The drawings are briefly described below.

DETAILED DESCRIPTION OF THE DRAWINGS

A first preferred embodiment of the invention is illustrated in FIGS. 1–4. This embodiment provides an extruded confectionary stick 10 extending in a generally long, rectangular shape, though other configurations may be envisioned as well. Confectionary stick 10 is provided with a plurality of longitudinal grooves 20. In this embodiment two grooves 20 are formed in the top surface 30 of confectionary stick 10, and three grooves 20 are formed in the bottom surface 40 of confectionary stick 10. However, it will be appreciated that other numbers and configurations of grooves are possible, the foregoing being merely an illustration.

Figure 1:
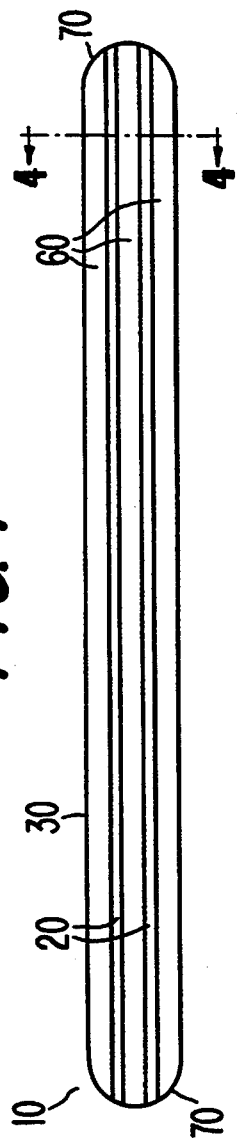
FIG. 1 illustrates a top view of an extruded confectionary stick according to a first preferred embodiment of the invention.
Figure 2:
FIG. 2 illustrates a side view of the extruded confectionary stick according to the first preferred embodiment of the invention.
Figure 3:
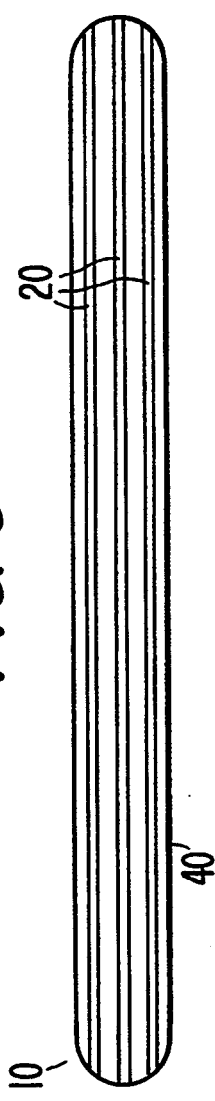
FIG. 3 illustrates a bottom view of the extruded confectionary stick according to the first preferred embodiment of the invention.
Figure 4:
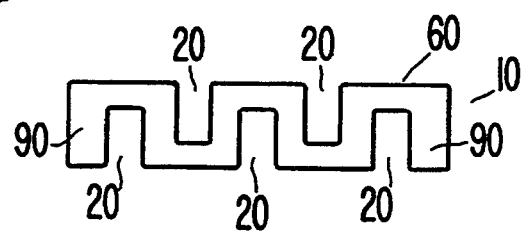
FIG. 4 illustrates an end view of the extruded confectionary stick according to the first preferred embodiment of the invention.

As can be seen in FIG. 4, the grooves 20 in the first preferred embodiment are illustrated as having a generally rectangular, slot-like shape with flat upper surfaces, or lands 60 extending therebetween. The grooves 20 may be formed of a narrower width than lands 60.

The confectionary stick is manufactured by an extrusion process, which generally involves metering an extrudible plastic material into a heated chamber or barrel in which a screw is rotating. The action of the screw moves the plastic material through the chamber so that it is compacted and plasticized to a flowable form in the heated environment. The resulting melt is then forced under pressure through a tool or die having an orifice configuration corresponding to the desired profile of the confectionary stick 10. The resulting product has a constant cross section, which in the case of the illustrated first preferred embodiment, generally forms a repeated dog-leg pattern. In principle, such an extrusion process is well known to those skilled in the art.

Suitable extrudible plastic materials include thermoplastic polymers, such as, but not limited to, polypropylene, polystyrene, polyethylene, or combinations of the same.

After extrusion through an appropriate tool or die, the extruded material may be cut to desired length, with rounded end portions 70 as in the illustrated preferred embodiment. Cutting may, for example, be performed with pinch rolls fitted with cutting dies, or in any other suitable manner. The pinch rolls may in one embodiment have a rough surface which imprints or scars the surface of the extruded material.

Significant cost savings are achieved through use of such an extrusion process to form the confectionary stick 10 of the invention, since it avoids the tooling, maintenance, and slower production rates which are typical in injection molding. This generally results in a lower per-unit expense. The use of extrusion moreover permits the formation of grooves 20 in configurations which are not practical in molding or casting procedures.

Furthermore, in forming the grooves 20 as illustrated in the drawings it is possible to reduce the amount of material which would otherwise be necessary in order to maintain the overall mechanical strength and rigidity required to support a confectionary material.

A further advantage of the grooved configuration is that it strengthens the adhesion of the confectionary material to stick 10.

Finally, if grooves 20 are formed generally of a narrower width than lands 60 and 65, it will consequently not be possible for any edge portions of confectionary stick 10 to become lodged in the grooves of an adjacent stick, eliminating stick interlock and making bulk handling, shipping and automatic dispensing of the confectionary sticks more convenient.

Figure 5:
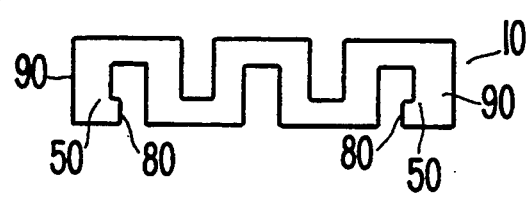
FIG. 5 illustrates an end view of the extruded confectionary stick according to a second preferred embodiment of the invention.

In a second preferred embodiment of the confectionary stick of the invention illustrated in FIG. 5, the outermost of grooves 20 of confectionary stick 10 are provided with an undercut portion 50, as well, using an appropriate tool or die in the extrusion. The undercut portion 50 in this embodiment forms a projection in the end walls 90 of confectionary stick 10, and thus forms a lip or ridge 80 near the surface of the stick 10 which reduces the width of the groove opening.

Figure 6:
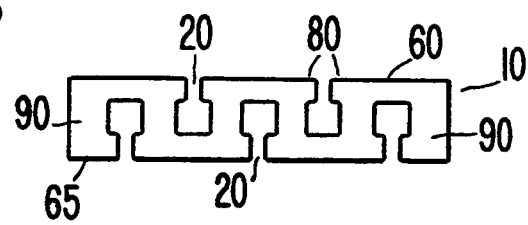
FIG. 6 illustrates an end view of the extruded confectionary stick according to a third preferred embodiment of the invention.

In a third preferred embodiment of the confectionary stick of the invention illustrated in FIG. 6, each of grooves 20 of confectionary stick 10 is provided with an undercut portion 65, as well, using an appropriate tool or die in the extrusion. The undercut portion 65 in this embodiment forms a projection in each of the walls of confectionary stick 10, and thus forms a lip or ridge 80 near the surface of the stick 10 which reduces the width of the groove 20 opening.

Figure 7:
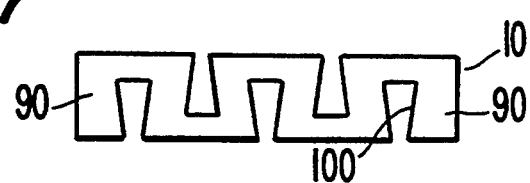
FIG. 7 illustrates an end view of the extruded confectionary stick according to a fourth preferred embodiment of the invention.

In a fourth preferred embodiment of the confectionary stick of the invention illustrated in FIG. 7, each of the grooves 20 of confectionary stick 10 is provided with a generally inclined inner surface 100 between lands 60 which forms a slanted, keystone shaped configuration.

The confectionary stick 10 of the invention may be used in connection with any number of confectionary products, including, for example, ice cream bars, flavored ice bars, hard candy and other known confectionary products.

The foregoing description of the extruded confectionary stick of the invention is illustrative, and variations on certain aspects of the inventive stick and method will occur to persons skilled in the art. The scope of the invention is accordingly intended to be limited only by the following claims.

What is claimed is:

1. An extruded plastic confectionary stick, comprising:
an extruded plastic profile, having a generally rectangular cross section and a plurality of longitudinal grooves on at least one of its surfaces, with lands between the grooves, the grooves having a width less than the width of the lands, and at least one of the grooves having a width at its base which is greater than its width at the surface of the stick.

2. An extruded plastic confectionary stick according to claim 1, wherein at least one of the grooves has an undercut portion so as to form a lip projection in the groove at the surface of the stick.

3. An extruded plastic confectionary stick according to claim 1, wherein at least one of the grooves has an undercut portion so that it has a substantially keystone configuration.

4. A method for making a plastic confectionary stick comprising the steps of:
(a) extruding a continuous length of molten plastic to produce a profile having a generally regular cross section and a plurality of longitudinal grooves on at least one of its surfaces, with lands between the grooves, said extruding being done such that the grooves have a width which is less than the width of the lands, and such that the width of the base portion of at least one of the grooves is greater than its width at the surface of the stick; and
(b) cutting the profile to produce sticks of a length suitable for confectionary sticks.

5. A method for making a plastic confectionary stick according to claim 4, further comprising the step of:
(e) extruding at least one of the grooves with an undercut portion such that a lip projection is formed in the groove near the surface of the stick.

6. A method of making a plastic confectionary stick according to claim 4, further comprising the step of:
(e) extruding at least one of the grooves so that there is an undercut portion in the groove near the surface of the stick.

7. An extruded confectionary stick, comprising: an extruded plastic profile, having a generally rectangular cross section, a plurality of longitudinal grooves on at least one of its surfaces, and lands between the grooves, wherein a portion of at least one of the grooves is broader than the portion of said groove at the surface of the stick.

* * * * *